United States Patent [19]
Mills

[11] 3,859,899
[45] Jan. 14, 1975

[54] INTERIOR VENTILATION SYSTEM WITH SIDE VIEW MIRROR DE-ICING

[76] Inventor: John Edward Mills, 15142 Drake Rd., Strongsville, Ohio 44136

[22] Filed: Feb. 14, 1974

[21] Appl. No.: 442,676

[52] U.S. Cl. .................................. 98/2, 350/302
[51] Int. Cl. .................................. B60h 1/24
[58] Field of Search .............. 98/91, 92, 2.00, 2.04, 98/2.08, 2.09, 2.10; 296/152; 350/61, 63, 302

[56] References Cited
UNITED STATES PATENTS

| | | | |
|---|---|---|---|
| 925,329 | 6/1909 | Goodrich | 98/91 |
| 2,252,161 | 8/1941 | Borba | 350/302 |
| 2,523,923 | 9/1950 | Rodert | 98/2.08 |
| 2,569,576 | 10/1951 | Ramml | 350/302 |

Primary Examiner—Meyer Perlin
Attorney, Agent, or Firm—P. D. Golrick

[57] ABSTRACT

A motor vehicle passenger compartment ventilating system exhausts warm interior air, through a window region or sub-window region door-mounted sideview mirror housing and over the mirror for de-icing or clearing the mirror of deposited precipitation.

18 Claims, 8 Drawing Figures

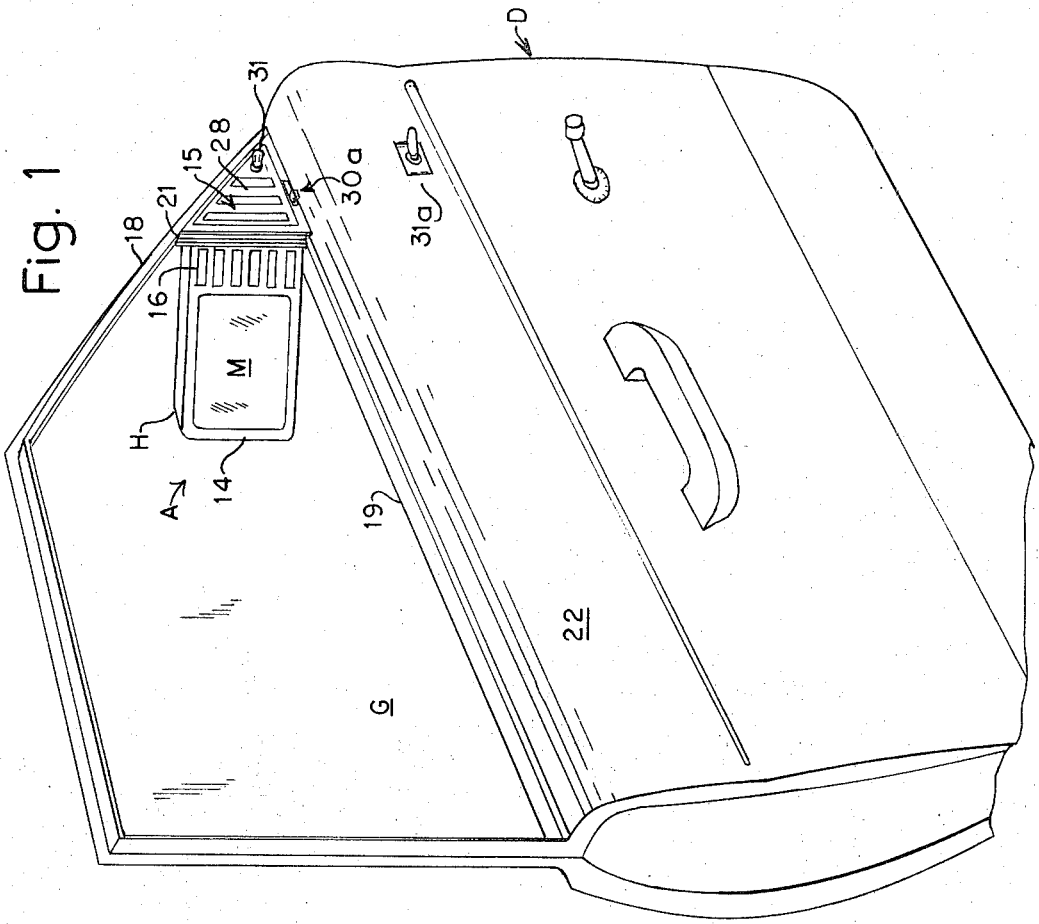
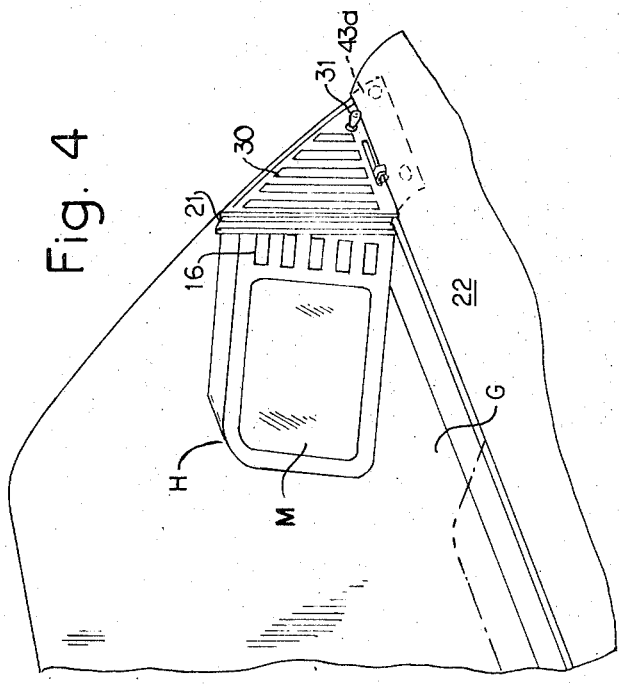

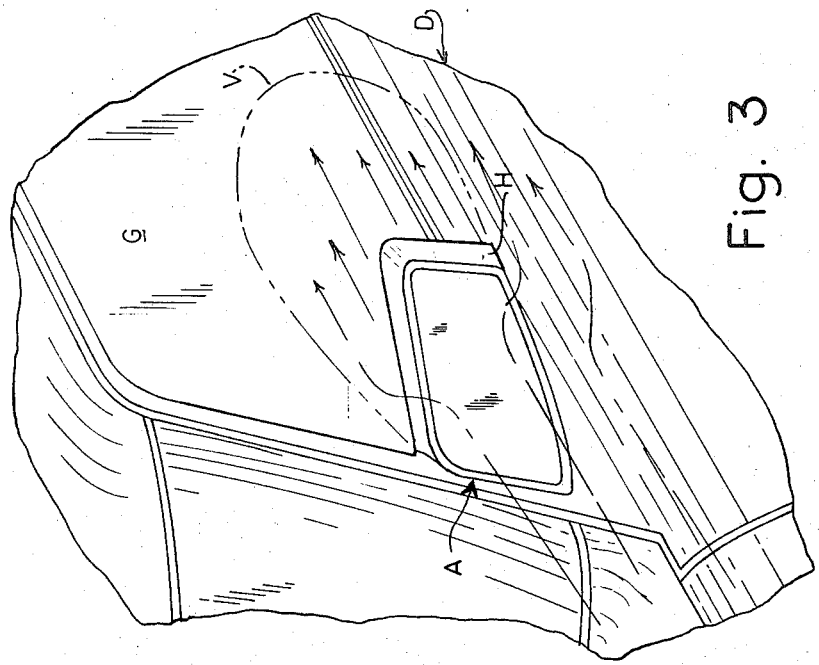
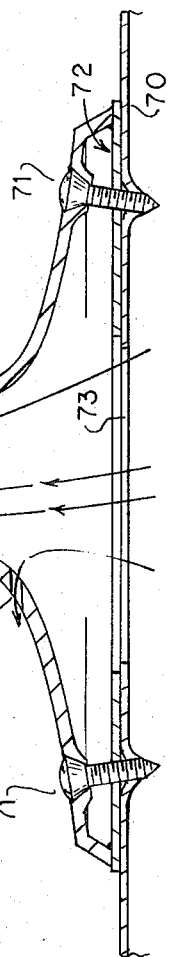
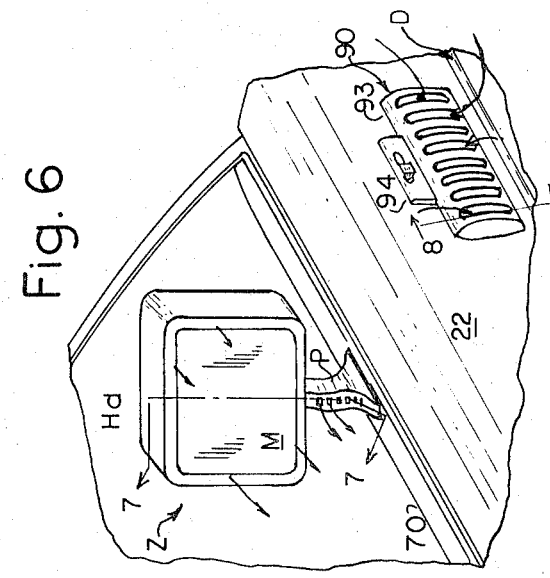
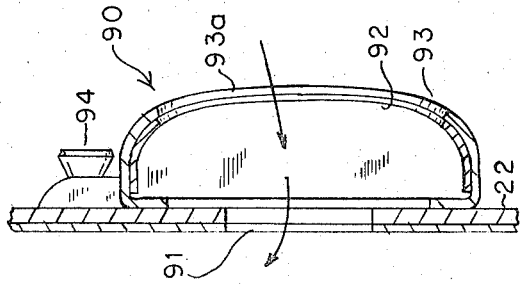

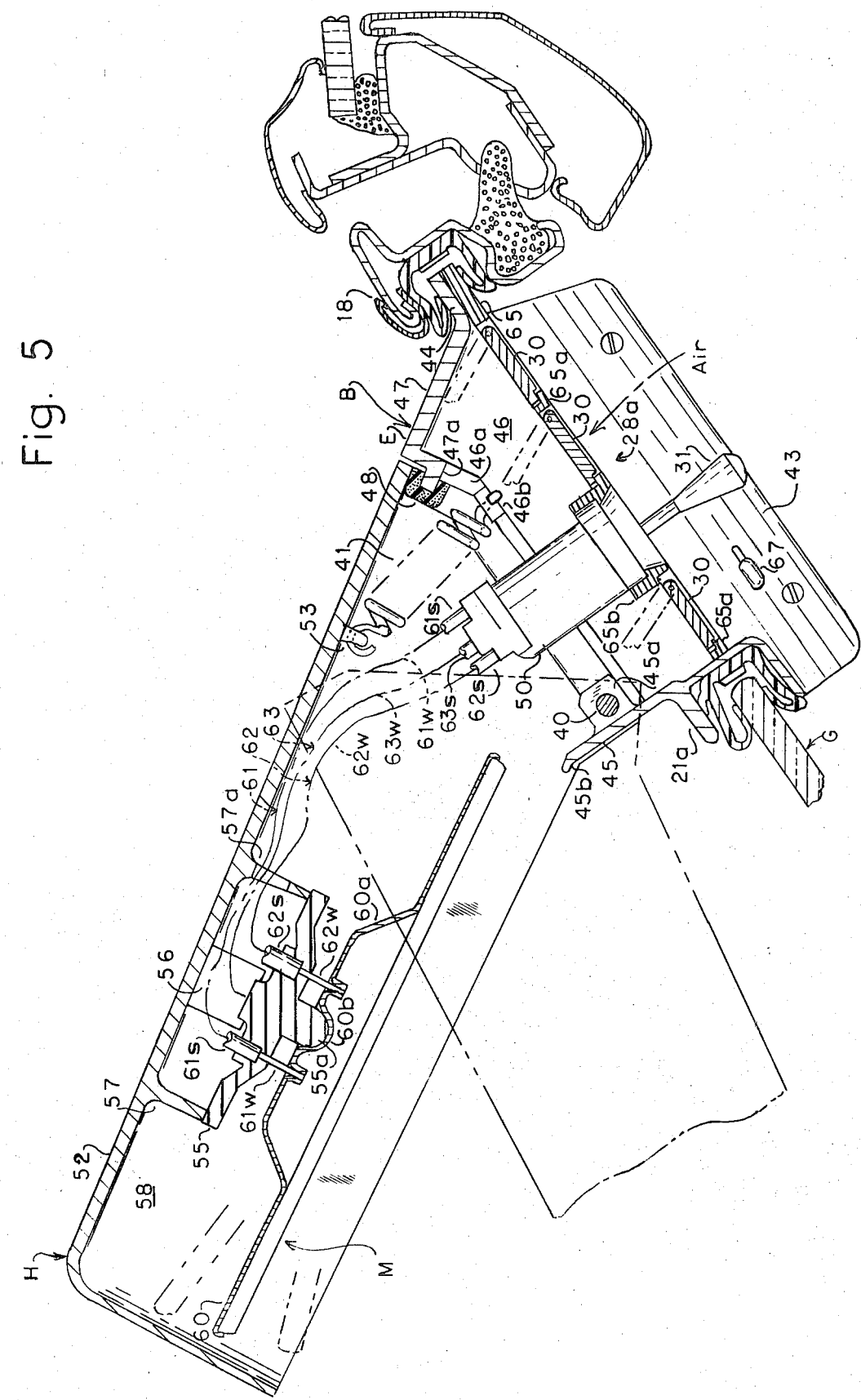

INTERIOR VENTILATION SYSTEM WITH SIDE VIEW MIRROR DE-ICING

Herein the terminology "slip stream" or "slip stream air" signifies the relative flow of air over the surface of the vehicle due to the forward traveling motion of the car in normal operation, or the flowing air itself; "interior air" signifies air in or moving from the passenger space of the vehicle, and "sideview mirror" signifies an outside rearview mirror mounted laterally of the vehicle at a position viewable by the driver, especially one mounted on a vehicle door. For simplicity of description and discussion herein the process of or the achieved result of clearing material from a sideview mirror will here be termed "de-icing" with corresponding use of the verb "de-ice;" though in fact the material in question may be frost, frozen rain, melting and refrozen snow, or adherent rain water droplets or the like, and whether the material is initially accumulated or is being continually swept away as deposited to prevent accumulation.

Sideview mirrors on automotive vehicles often are rendered useless or are greatly impaired in rearview display function by adherent dirt and especially precipitation, such as snow, frost, sleet, freezing rain, ice, either accumulated during open air parking or deposited and perhaps accumulating during travel, thereby causing an unsafe vision condition for the driver, often at a time when weather conditions are otherwise rendering driving hazardous to some degree, a matter often exacerbated as well by the usually relatively small reflecting area of such mirrors. Consequently there have been numerous proposals for improvements in outside mirror accessories intended to cure or at least minimize these problems.

Thus, for example, the mirror element has been rotatably mounted and means provided to cause a rotation expected to clear rain, melting snow, or loosely adherent dirt by centrifugal forces. By similar drivings a wobble mirror has been slowly driven to change the effective sight direction of the mirror and thereby in effect scan a larger visual reflected field. Other prior proposals heat the mirror to prevent or remove ice, using direct electrical resistance heating of the mirror element, for example, by a resistance heated plate abutting a housing-enclosed or back face of the mirror element, or by passing current through a front face reflecting, deposited metal coating. Also slip stream air has been passed over a heated resistance either before deflection across the external mirror surface or in passing through the housing to encounter the internal side or back of the mirror as it passes to housing exhaust points.

Similarly, a heated gaseous medium deriving heat from the waste heat of the internal combustion engine has been used for a like purpose. Thus a portion of the exhaust gas from the engine has been diverted through an appropriately sealed hollow mirror housing, therein passing across the back of the mirror element and thereafter exhausted in appropriate and safe manner. In some circumstances even the warming of the mirror has been conducive to more rapid runoff of rain. By another proposal, air from a compressed air storage tank, under discharge valve control, is passed through a heat exchanger arrangement at the engine exhaust manifold, and thence through a tube forming in effect a heat exchange element loop in the housing behind the mirror, finally to exhaust as a mirror surface sweeping jet.

Simple air deflectors have likewise been mounted adjacent to the mirror to direct slip stream air across the external mirror face, for multiple purposes of preventing impingement and "build up" on the mirror surface of air-borne dirt in eddies aft of the mirror housing, further of sweeping rain drops, adherent melting snow, or sleet from the mirror surface.

These and other prior proposals have various disadvantages, such as limited effectiveness for the principal goal of keeping the mirror surface suitably clear, especially under more critical conditions, though having an apparent simplicity; while others entail undue complexity of structure, with attendant cost and greater likelihood of malfunction.

Thus, mirror accessories heated electrically, whether the resistor element be a front reflecting mirror coating itself, a resistance heated backing plate or a resistance heater element disposed in the path of an air stream impinging upon or surrounding the mirror, all require wiring to the vehicle electrical system; embody elements of comparatively high cost; and, of course, are subject to the common and typical electrical failures.

On the other hand, rotationally driven mirror elements, whether driven directly or indirectly by slip stream air, by cable from the engine drive system or an electrical motor in the vehicle interior, or by a small motor within the mirror housing, all obviously first require an appropriate mirror supporting shaft and bearing mounting; structure both subject to damage and needing servicing at least in lubrication; and secondly entail additional structure for producing or coupling the driving torque itself. These characteristics represent added cost for the components themselves, for their installation and maintenance, and at times objectional increase in the size of the sideview mirror unit. On the other hand, mirror cleaning or de-icing systems utilizing hot wash water or hot compressed air, though avoiding certain difficulties or undesirable aspects of electrical wiring, running into the mirror accessory unit mounting, yet require at least fluid conduits from the fluid supply point usually in or above the engine, again presenting added costs of installation and maintenance and exposure to conduit damage, especially with the mirror unit mounted on the doors at either side of the driver.

The present invention, by a distinctly different approach incorporates a sideview mirror, mounted on some part of the overall door structure, especially convenient on the driver's side, into the passenger compartment ventilating system as an exhaust conduit for at least a part of the interior air normally leaving the vehicle passenger space, the heat of which serves to clear the mirror. The hollow housing, at its base region mounted to the door structure, provides an air inlet to a hollow housing space behind the mirror plate element, through which vented heated interior air may flow, passing around and heating the mirror, to exhaust through housing vents appropriately disposed; particularly in the "bezel" surrounding or framing the mirror, or between the mirror element edge and a surrounding portion of the housing, and through other housing vents more remote from the mirror. Thus even a normally desired ventilation exhaust air flow from the heated interior is used to heat the mirror element for clearing, cleaning, de-icing or other like functions promoted by heat or a scavenging air sweep.

The mirror glass retainer itself in the overall housing structure may be finned to increase heat transfer from the flowing air to the structure more immediately associated with the mirror.

Moreover the mirror housing itself is preferably so shaped, and the vent regions thereof so aimed that a part of the exhausted air will itself be directed from the mirror housing at the exterior surface of the adjacent window of the door upon which the mirror is mounted, a feature of special value in keeping this window area free of adhering precipitation, especially snow, sleet and ice, and thereby markedly improving the vision for the driver under adverse and inclement weather conditions.

The invention may be embodied, for example, in a mirror accessory having a base or pedestal mounted more or less conventionally on or just below the external window sill region of a front seat door, to communicate through an aperture in the underlying supporting metal panel with the door interior hollow and thereby with a vent aperture in the interior door panel; the latter being covered by an air vent or grille, adjustable as desired, for its exhaust air flow, so that the air passes in effect through the door into and through the mirror housing to achieve the desired result.

By another embodiment of the invention, a new and rather distinct form of mirror housing and mounting is used in which an elongated projecting hollow mirror housing has its door based end secured in and occupying the now usual forward or front lower corner apex of the glassed window space; and the inner end of the housing either itself serves as, or is provided with, an interior vent grille or escutcheon face plate. This, as a permanent immovable structure provides both the ventilation vent at the interior of the passenger space; and, as well, in a manner acceptable from design and appearance considerations, shortens the forward reach of the door window glass area, resulting therefore in glass cost savings. Where a directional mirror control is used, the finger lever or manual control thereof may be optionally located either as now rather common, on the interior of the door panel, or on the mounted inner end of the mirror housing, facilitating installation, and simplicity of structure.

Both such general types of mirror arrangement have the common feature that the mirror housing serves as a channel for the interior air ventilation system exhaust, thereby to utilize heat otherwise wasted with the air vented to the exterior, and also to afford communication with the readily available volume of warm air for the desired function as needed. Further, by the very form and disposition of the mirror accessory unit, with exhaust outlets surrounding the mirror itself and perhaps also at other rearwardly facing mirror-adjacent portions of the unit housing, there is developed an aspirating effect due to the low pressure area arising behind the mirror housing structure, in consequence of the passage of the slip stream during the forward travel of the automobile.

Thus, especially in the inclement weather conditions usually giving rise to the more objectionable accumulation on the mirror, when particularly the usual car interior heater will be heating the interior, the warm interior air will be continually drawn out in at least a small amount requisite for keeping the mirror clear, even though the vehicle does not have a positive pressure type ventilation and heating system. On the other hand, when a driver finds his outside parked car with an accumulation of frost, ice, snow or the like on the mirror, in short order before starting to drive, he can clear the mirror by waiting briefly for engine warm-up and standard heater operation to warm the car interior, and therewith the positive pressure ventilation clears the mirror; at least then by manipulation of the usual heater and air ventilation controls, he can achieve the positive pressure within the passenger space, to cause warmed air to vent through the aforedescribed mirror systems. Also when as previously described, the mirror system is so designed and aimed, that the exhausting air is directed towards the adjacent window, the latter will in like fashion after a little delay be de-iced or cleared.

The general object of the present invention is then to provide a comparatively simple yet improved system and method for de-icing a sideview mirror of an automotive vehicle.

Another object of the present invention is to provide an arrangement whereby a sideview mirror is incorporated into passenger compartment ventilating system, or more specifically the exhaust of such system, thereby to make use of the heat of interior air exhausting from that compartment for mirror element de-icing purposes.

Another object of the present invention is to provide a convenient and simply mounted sideview mirror unit which may serve as part of the passenger vehicle ventilating exhaust means and thereby utilize interior-air-carried heat otherwise lost.

Another object is to provide a sideview mirror arrangement serving as a portion of the exhaust system for the passenger space of the vehicle which may in particular cases serve also to keep an adjacent area of the door window clear for mirror observation and other driver vision purposes.

Another object is to provide a side view mirror unit of the type described which is adapted, upon striking an object when the vehicle is in forward motion, to yield rearwardly and fold back toward the vehicle, reducing the impact and the outward projection of the unit.

A further object is to provide a unit with a yieldable housing also adapted to return to normally projecting disposition after folding back, if not seriously damaged by the impact.

A still further object of a particular disclosed embodiment of the invention is to provide a side view mirror, serving as a part of the passenger vehicle space ventilation exhaust means, which is mountable in a forward lower apical portion of modern front door window structures and shapes; and which in addition to serving its own specific function, enables use of smaller glass blank for the window area.

Other objects and advantages of the invention will appear from the following description and the drawings wherein:

FIG. 1 shows one form of side view mirror adapted for mounting in what is normally part of the window area of current designs and certain adjacent door structure;

FIG. 2 is a fragmentary detail of the housing inboard end;

FIG. 3 is an exterior view;

FIG. 4 is a view similar to FIG. 1, but limited to a unit as such with a mounting region modification;

FIG. 5 shows in horizontal section a modification of the window mounted unit;

FIG. 6 is a view similar to FIG. 1, but showing an embodiment of the invention in a more conventional type of side view mirror form and mounting arrangement;

FIG. 7 is a fragmentary section taken at 7—7 in FIG. 6;

FIG. 8 is a fragmentary section taken at 8—8 in FIG. 6.

With respect to the two distinct and particular embodiments of the invention and passenger space of the vehicle (whether the same be a passenger vehicle as such, or the driver's cab in a truck or other commercial vehicle), though only the particular mounting and form of mirror units and their assembly to and association with the doors at the driver's seat or front seat of the vehicle are dealt with, it is to be understood, of course, that the vehicle is provided with a heater to warm the air of the passenger space, which heater may be any of a variety of standard or non-standard forms; and further that the space is completely enclosed or encloseable, when the doors and windows are shut, with of course there being the usually available ancillary ventilating ducts and controls as well. Such environmental structures and accommodations being now conventional and universally known, they require here no further description.

For one aspect of use or performance of the invention, it is observed that, in the majority of current passenger type vehicles, so also in cab spaces of commercial vehicles, the heating and ventilating system generally affords such controls as introduce external air into the vehicle through the air heating system, so that a slight positive air pressure is present in the vehicle passenger space relative to free external atmosphere even when the vehicle is stationary; so that generally under such setting or conditions air is leaking to some degree in a normally expected fashion at various parts or joints of the vehicle passenger compartment structure; e.g., around the door opening seals and window seals and the like, which though effective to prevent objectionable inward leakage drafts or inward diffusion of dangerous engine exhaust gas, yet are not, of course, hermetically sealed or closed.

In FIGS. 1 and 2, the door-mounted side view mirror unit designated A as a whole, comprises a hollow housing H laterally projecting from the vehicle body, and of a somewhat box-like form mounting at an appropriate mirror view opening in its rear i.e., trailing, vertical side, a mirror plate or element M supported and held in known fashion by appropriate back plate, or clips, grips or seals around its periphery, or in an interior mounting "pan;" at 14, the continuous periphery of the back edges of top, bottom and side walls or a framing bezel-like edging of the housing surrounding and defining the view opening; a mounting base 15 with associated structure providing, as a ventilation outlet point from the passenger compartment, a controlled air passageway into the housing for air to flow behind and around the mirror to exhaust principally between the margin or the opening and mirror periphery; and, between the view opening and housing inner end or base 15, an ancillary air outlet 16 is provided by a grille-like array of parallel slots through a housing rear wall portion.

FIG. 1 represents one typical modern design for the window area of door D where at the door upper region a top window framing edge 18 slopes or curves forwardly and downwardly to meet the top edge 19 of the window sill or door "belt" region adjacent the glass-receiving horizontal slot of the hollow lower door portion 22. For purposes of this invention, a short vertical "strut" 21, in conjunction with the "belt" 19 and the sloping edge element 18, forms a small triangular frame providing an opening at which is located the inner lateral end or base of the mirror housing. This strut 21, at its rear vertical edge channel-shaped and provided with a conventional channel-shaped seal, forms a guide and seat for the front vertical edge of the window blank or sheet G.

For this particular type of window framing door structure, the unit housing may have an open frame-like inboard end 15a "necked down" to form at least vertical and forward sloping shoulders 25, 26, respectively engaging outer surfaces of the described small triangular frame of the door; and the reduced portion, abutting and extending inwardly of these framing parts 19, 21 is rigidly secured thereto as by screws and also by screws into the door sill, with appropriate sealing. The housing may be further anchored by an escutcheon type decorative apertured vent grille and anchor plate 28, in overlapping engagement with inner margins of these same framing portions, and in turn secured by screws threaded into boss formations 29 within the housing end. Moreover, the channel-shaped element 21 may itself be an integral part of the housing base. Vertically pivoted, louver-like elements 30 may be and preferably are used in the base anchor plate 28, for ventilation exhaust air flow control, with linkage operator at 30a.

The mirror element M is supported for a limited universal adjustable tilting within the housing by a known swivel type support and Bowden cable actuator system operated by a mirror control lever 31, preferably mounted in the escutcheon grille plate but optionally locatable at 31a on the inside panel of the door.

Though here the mirror element M is shiftable within the housing for vision direction setting, and a gap between the mirror edge and the surrounding margin of the opening is the principal air discharge area; the mirror can be fixed in the housing, and the housing be tiltable through a hollow ball-and-socket connection to a hollow pedestal-like base providing an air passageway; in which case, if desired, bezel slots or perforations, as air discharge openings, can be used in place of the gap and so direct air in jets across the mirror surface. Other variations will be latter discussed. In all cases the exhaust air in flowing to the housing principal discharge region warms the mirror element for deicing.

The grille openings at 16 not only may serve for ventilation ancillary discharge of air in addition to the previously described bezel apertures or the air flow gap about the mirror, but also may be internally shaped to direct some air toward, and thus to clear off, the adjacent window glass area V in the mirror vision path of the user (see FIG. 3); a purpose promoted also in some degree by the shaping of the ancillary discharge openings for aiming discharge and by the disposition of the housing directing main air discharge at the window.

Where a frameless door-glass or "hard-top" body style is the vehicle environment of use, that is, where the construction of the door itself does not provide framing for the top or forward edge of the window glass, but the latter is rather seated directly to body seals, carried on the adjacent door framing body parts, the base and mounting structure for the mirror unit housing will (see FIG. 4) be rigidly screw-secured to the door panel by appropriate flanging 43a on its bottom region; will include the window glass guiding channel 21 as a integral part thereof; and will then have its sloped forward edge making contact with the door seal.

In FIG. 5, the modification shown in horizontal section for a left side mirror unit configuration presents a structure for the housing which is especially advantageous from the view point of safety, as it can pivot or fold back upon its base, should it strike say a pedestrian or other object outside the forwardly moving vehicle, thereby to minimize bodily injury, or to avoid or minimize damage upon hitting an external object. Here a principal outrigger portion H of the housing, with its entire back or trailing side and also its inner end open, is pivoted at its back inside corner to the housing base portion B by a vertical pivot pin 40, but is held in the normal "swept back" projecting disposition by bias means such as the helical tension springs 41. A right hand unit will have the mirror-image configuration; with, however, the later described mirror actuator cables fed through the door post to a control lever fitting positioned on the dash, adjacent the driver's position.

The base B, fabricated preferably as a die casting as is the principal housing part H, integrally includes a bottom part 43 conformed to the shape of the underlying door belt or sill region and thereto secured by screws; a hollow stubby external extension E of more or less quadrilateral fore-and-aft vertical cross section carrying the housing shape in to terminate in a triangular formation completing the normal outline of the window space at the plane of the glass; this formation along its back margin including the vertical channel 21a for a guide and seal structure for the window glass forward edge, and a sloped or curved front margin or edge strip 44 to engage in the window seal in the usual sloping window framing edge element 18 of the door.

The extension back wall 45 running out from channel 21a carries vertically spaced apertured inward lugs, as 45a, for the pivot pin 40 endwise engaging the housing top and bottom walls; and a wall lip 45b projecting slightly into the housing back opening defines the inner vertical margin of the mirror view opening. The outer margins of the extension bottom wall 46, front wall 47 and top wall are inwardly offset, as shown at 46a and more clearly at 47a, to result in a somewhat rabbet-like end shape, accepting thereover a continuous, preferably cemented-on seal 48 of U-shaped cross section whereby these extension wall ends are sealed to the respective interior marginal portions of the open inner end of housing part H received slightly telescoped thereover.

Base B also is shaped as, or to accommodate, a frame which supports a louver structure 28a in its air passage opening provided by the extension E, and as well, in the left hand unit shown, mounts the mirror tilt control lever fitting 50 presenting control lever 31 to the user of the vehicle.

On the housing front wall 52, cast apertured lugs preferably merging into adjacent top and bottom wall portions, and respective inward lugs on the inset top and bottom base extension wall margins, provide attachment points for the hook ends of upper and lower housing bias springs, as shown at 53 and 46b for the lower spring 41.

To support the mirror within the housing, generally conventional limited universal tilt mounting and actuation control are used. Thus, a bracket plate 55 is bolted to a cast housing boss or pad formation 56 and is rearwardly supported by spaced integral vertical ribs 57-, 57a running from the bottom housing wall 58 part way up the front wall 52; and a drawn sheet metal pan 60, with edges curled to embrace the mirror periphery, in a rearwardly offset portion 60a, has a nearly semispherical recess or socket 60b swivelingly seated on the correspondingly rounded end of a bracket pivot post 55a.

For tilt actuation and control three Bowden cables, side-cables 61, 62 and bottom cable 63, are operatively connected between the control fitting 50 and the mirror mount; the opposite ends of the sheaths 61s, 62s, 63s being anchored in side and bottom sockets respectively of the bracket plate 55 and of the control fitting casing, with the opposite ends of the respective cable wires 61w, 62w and 63w being extended beyond the sockets to attachment points on mirror pan 60 and on an internal plate on control lever 31. The attachment points are similarly oriented at locations equi-spaced about the pivots of the pan and lever plate; the mirror being held seated by wire tensioning action of a prestressed helical compression spring acting on the lever plate within the casing 50. The three cables, individually represented in greater part by dot-dash lines, are enclosed in a common flexible tubular protective casing.

This type of mirror mount and actuation can, of course, be used for the FIGS. 1–4 forms of the invention.

Within the opening of base B, at about the plane of glass blank G, there is secured a sub-assembly 28a comprising a frame 65 spanned by spaced vertical posts 65a defining therebetween air inlet spaces controlled by louver elements 30 swingable about vertical pivot axes or shafts out into the base extension; a back socket 65b being formed on frame 65 for reception and securement therein of the fitting 50 with its lever 31 projecting through the frame for operator access. An appropriate louver or vent control linkage of conventional form is provided between the several elements 30 and a control push button 67.

Since the mirror glass itself conducts heat rather poorly, to increase the heat transfer from flowing vented air to the mirror region, various mirror-associated metal formations may be used, which (whether the mirror element itself be tiltable or not in the housing) may take the form of a shallow pan-like mirror glass retainer of stamped metal or the like, covering much of the mirror back and embracing its edges, while serving then for engagement by other mounting elements secured to or in the housing, as in the mounting described for FIG. 5. The inward base of such retainer or pan may bear fins to achieve an increased heat transfer to the general body of the pan, which then, by its side area of contact with the mirror element back and margins, effects a more rapid and thorough warming of the glass.

FIGS. 6, 7 and 8 show a mirror assembly designated Z as a whole) of somewhat more conventional form in its mounting by a pedestal-like base P to an external ledge or outwardly bowing portion 70 of the principal hollow door region, into which the passenger compartment air is immediately discharged to pass thence through the mirror unit.

The hollow pedestal base P at 71 is screw attached with appropriate sealing 72 in conventional manner to the door structure D over a hole 73 through the door panel metal. Through the pedestal P can have an appropriate hollow ball-and-socket connection to the housing portion Ha for manual setting or adjustment of mirror aim position, and to preserve communication (at various housing orientations) to the hollow mirror housing from the base, hence the interior of the door, here the mirror has a tiltable support within the housing. Thus the pedestal P and housing portion Ha relatively immovable, though for convenience in manufacture being separate components.

Here again the mirror element M is appropriately set or held in a conventional stamped sheet metal pan 74 in the outwardly offset central back region of which a socket 74a captively receives and, to hold aim setting, frictionally engages a ball element 77 screwed into a support bar or post 79 bolted at 80 to an integral interior housing boss 81. Again air entering the base passes about the mirror, and out the gap formed between the mirror edge and the housing wall margins; and if desired through supplementary discharge slots or openings 85 in a venting grille-like arrangement at the rearward or trailing face or wall of the pedestal. The housing Ha, at a bottom wall region to the windowward side of the central mirror support, is affixed to the hollow pedestal shank end by a pair of screws, such as 87, passed therethrough outboard of diagonal corners of a roughly square bottom wall air passage hole 88, into internal cast bosses 89 within the shank end.

On the interior of the hollow door section 22 to cover a vent aperture 91 in the door interior panel, there is mounted (see FIG. 8) an appropriately styled interior vent opening fitting 90 which may take various forms, but includes preferably a vent flow area control device such as a sliding slotted plate 92 which in the decorative external grille portion 93 is styled to the car's interior requirements, and has slots 93a adjustably covered by slotted plate 92 as shifted by knob 94.

Where it is desired to use a door-panel-mounted side view mirror unit, which is operable from the interior by a tilt actuating lever, the general arrangement of FIGS. 6-8 is used with appropriate mirror support in the housing and with the control cable lead through the pedestal and door structure to the conventional lever actuator fitting on the inside of the door.

The setting and use of the mirror for normal view purposes are of course, carried out in the well known manner for similar hand or lever mirror aim adjustments; and the safety function of the pivoted housing mounting should be immediately obvious, as permitting a backward deflection to the fragmentarily dash-dot outlined position in FIG. 5 resulting in a yielding blow on any object or person struck, and thereafter a spring biased return to normal and sealed position.

Likewise are obvious from the preliminary discussion and the detailed description, the use and function of the controlled ventilation by setting of the exhaust air flow controlling vents for desired ventilation induced by the aspirating effect of the slipstream passing the units and/or the positive internal pressure produced in the passenger space by ventilator blower or heater operation; and so also the mirror de-icing and cleaning effect resulting from the exhausting of the warm interior air through the mirror housing and about the mirror. Further the advantageous saving in glass cost for windows equipped with units such as those of FIGS. 1, 4 and 5 is readily apparent.

What is claimed is:

1. In an automotive vehicle having a body providing an enclosed space as a passenger compartment and a side view mirror mounted on that body exterior at a position viewable by the driver of the vehicle through a compartment window, the combination including:
    a said passenger compartment;
    a side view mirror unit comprising
        a mirror element,
        mirror mounting means including
            a hollow housing having a mirror view opening in a trailing side or wall of the housing, mirror supporting means supporting the mirror in the housing proximate to said opening, a hollow base mounting the housing on the said body exterior for conducting, to the housing, compartment interior air introduced thereto at the place of attachment on the body, said housing providing air discharge area at the margin of said opening and around the periphery of said mirror element, whereby interior air introduced into said housing in passing to said air discharge warms said mirror element for deicing and like purposes;

and
    an interior air exhaust controlling passageway from said compartment space to the locus of attachment of the mirror base, whereby said passageway and mirror unit form a ventilating system exhaust for the compartment space.

2. The combination described in claim 1, wherein said exhaust air controlling passageway includes an exhaust grille unit on an interior surface of the passanger compartment structure,
    said grille unit including exhaust air openings therethrough and means selectably setting the effective flow area of said air openings to control ventilating exhaust of compartment interior air to said mirror unit.

3. The combination described in claim 1, wherein said side view mirror unit is mounted on a door of the vehicle.

4. The combination described in claim 3, wherein the housing of said mirror unit has an open inboard end, the said place of attachment is a region defined in at the forward part of a door window opening between a forward edge of the door, the horizontal window sill, and an upright channel from the sill affording a guide for the forward edge of the window glass.

5. The combination as described in claim 4, wherein the said base is secured to the door within said region and projects from said housing through said region to provide said passageway and conduit.

6. The combination described in claim 5, wherein said housing is pivotally secured to said base to swing from a normal position rearwardly from said base back in toward the car body upon encountering an external object or person, and is spring biased to return to normal position.

7. The combination described in claim 3, wherein said exhaust air controlling passageway includes an exhaust grille unit on an interior surface of the passenger compartment structure, said grille unit including exhaust air openings therethrough and means selectably setting the effective flow area of said air openings to control ventilating exhaust of compartment interior air to said mirror unit; and said housing of the mirror unit, between its open inboard end and the mirror view opening, has a grille-like series of slots through the trailing wall, forming an exterior ventilation discharge ancillary to the said air discharge area.

8. The combination described in claim 7, wherein said mirror supporting means affords a limited universal adjustability of the plane of the mirror element within the housing for mirror aim setting, and includes a setting cable mechanism including plural Bowden cable means running through said housing and base to operating lever means accessible in said compartment.

9. The combination as described in claim 8, with said operating lever means mounted in said exhaust grille unit to project into the passenger compartment.

10. The combination as described in claim 8, with said operating lever means mounted on a door supporting said unit to project into the passenger compartment.

11. The combination described in claim 3, wherein the margin of the mirror view opening of said housing is spaced from the said mirror element, and the mirror element is so supported in the housing to afford air flow space from behind the element, around the edges thereof and past the margin of said view opening.

12. The combination described in claim 1, wherein said mirror supporting means holds the mirror element in fixed relation to said mirror view opening of the housing, said base comprises a hollow pedestal with one end secured to the vehicle body and the other end having a hollow swivel or ball-and-socket connection with the housing to afford a manually adjustable mirror setting for the mirror unit and air communication from the base into the housing.

13. The combination described in claim 12, wherein said pedestal has, through a trailing wall portion thereof, a grille-like series of slots to its hollow interior, forming an exterior ventilation discharge ancillary to the said air discharge area in the housing.

14. The combination described in claim 12, wherein said side view mirror unit is mounted on a door of the vehicle.

15. The combination described in claim 14, wherein the margin of the mirror view opening of said housing is spaced from the said mirror element, and the mirror element is so supported in the housing to afford air flow space from behind the element around the edges thereof past the margin of said view opening.

16. The combination described in claim 14, wherein said passageway is constituted of a hollow, window-mechanism-housing lower part of said door provided with a first opening through an inside panel of the door and a second opening, in an outside panel, into the said hollow pedestal, and disposed over the said first opening, an exhaust grille unit on an interior surface of the passenger compartment structure, said grille unit including exhaust air openings therethrough and means selectably setting the effective flow area of said air openings to control ventilating exhaust of compartment interior air to said mirror unit.

17. The combination as described in claim 4, wherein the said base has an open portion filling said region and an outward extension therefrom;

said housing has an open inboard lateral end slightly telescoped over the extension end and pivoted thereto by a vertical pivot in the back side of the extension;

bias spring means, normally holding said housing telescoped on said extension end, permit the housing to swing back on said pivot upon impact.

18. The combination of claim 17, including a seal element sealing the front, top and bottom walls of the housing to said extension.

* * * * *